United States Patent [19]
Choi

[11] Patent Number: 5,924,398
[45] Date of Patent: *Jul. 20, 1999

[54] FLOW IMPROVEMENT VANES IN THE INTAKE SYSTEM OF AN INTERNAL COMBUSTION ENGINE

[75] Inventor: Michael Choi, Belleville, Mich.

[73] Assignee: Ford Global Technologies, Inc., Dearborn, Mich.

[*] Notice: This patent is subject to a terminal disclaimer.

[21] Appl. No.: 08/944,578

[22] Filed: Oct. 6, 1997

[51] Int. Cl.⁶ ................................................ F02M 29/00
[52] U.S. Cl. .............................. 123/184.21; 123/184.53; 123/590
[58] Field of Search ............................. 123/590, 184.21, 123/593, 184.53

[56] References Cited

U.S. PATENT DOCUMENTS

| | | | |
|---|---|---|---|
| 4,274,386 | 6/1981 | Reyes | 123/590 |
| 4,741,295 | 5/1988 | Hosoya et al. | 123/568.17 |
| 4,867,109 | 9/1989 | Tezuka et al. | 123/568.17 |
| 5,722,357 | 3/1998 | Choi | 123/590 |
| 5,758,614 | 6/1998 | Choi | 123/590 |

*Primary Examiner*—Marguerite McMahon
*Attorney, Agent, or Firm*—Donald A. Wilkinson

[57] ABSTRACT

An air diffuser (20) for an air intake system of an internal combustion engine. The air intake system includes a throttle body (22) up stream from an intake manifold (24), with the air diffuser (20) mounted between them. The air diffuser (20) includes vanes (62,64) extending into its main bore (52) in order to diffuse and redirect the air flowing from the throttle body (22) into the intake manifold (24). An EGR assembly (70) is mounted to the manifold (24) just downstream of the inlet to the manifold (24). The diffusion and redirection of the air reduces the noise emanating from the intake manifold (24) for particular engine operating conditions, and also reduces the backflow of EGR gasses into the throttle body (22).

20 Claims, 3 Drawing Sheets

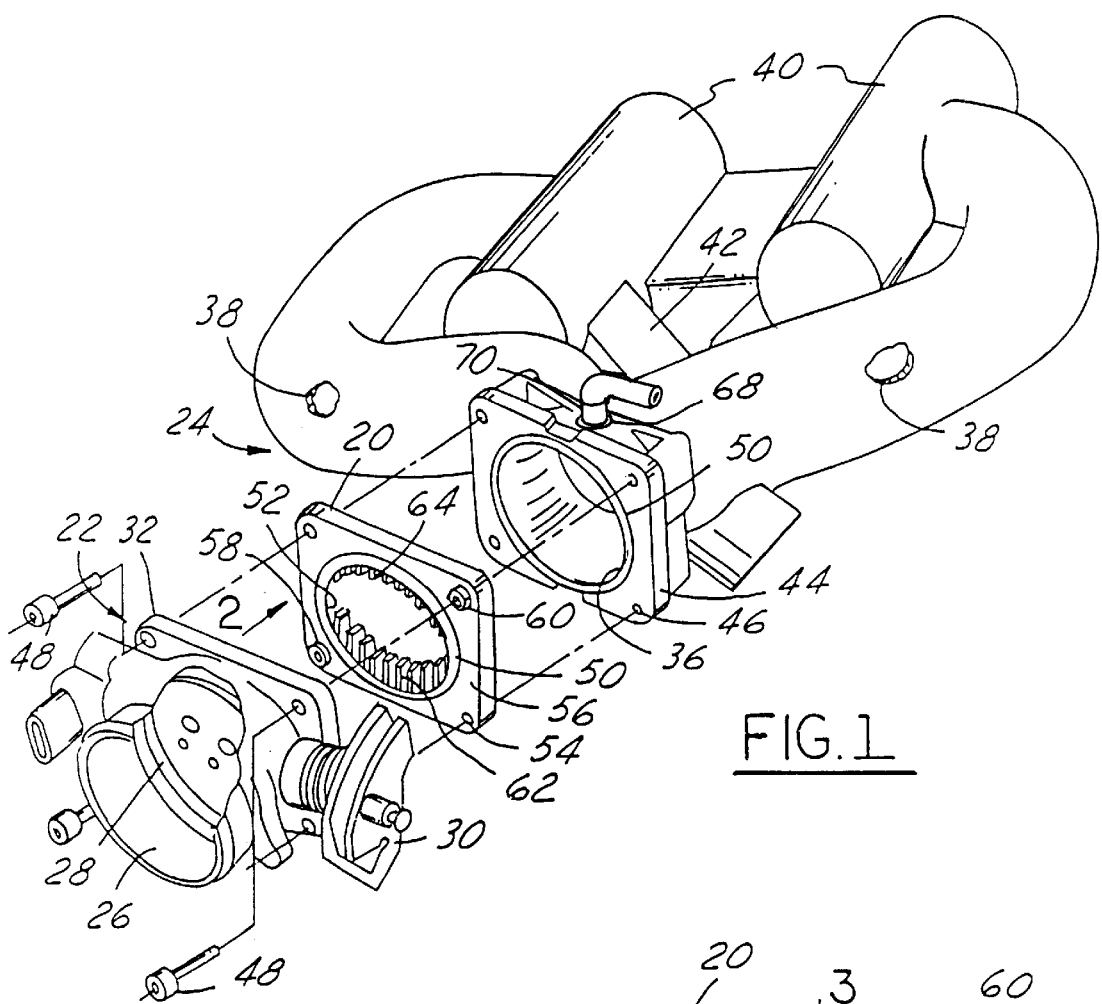
FIG. 1
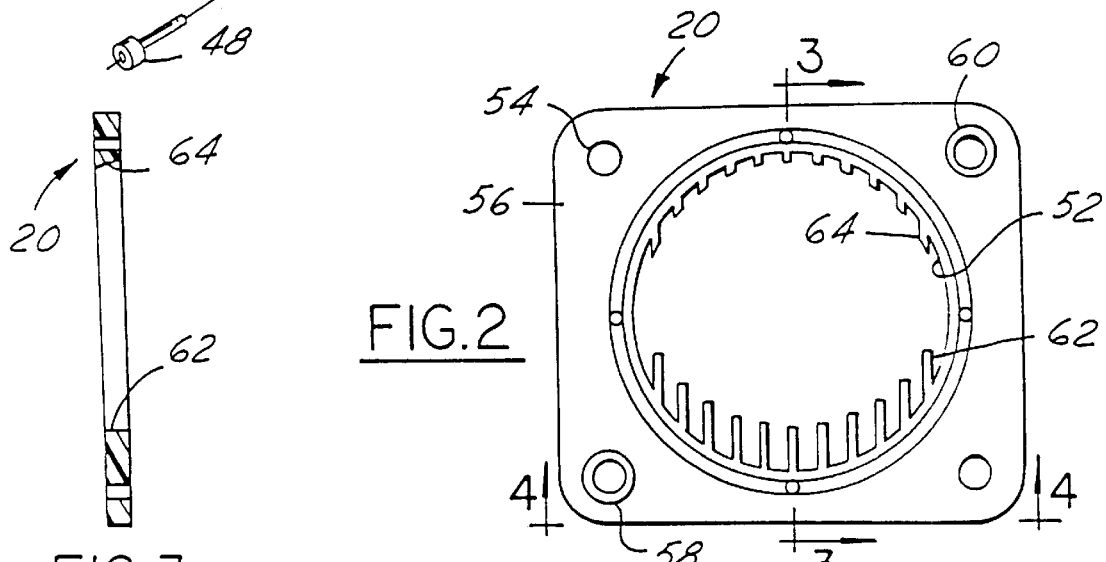
FIG. 2
FIG. 3
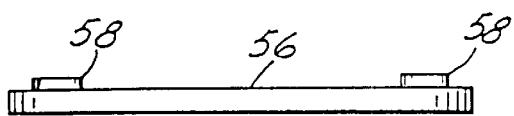
FIG. 4

FLOW IMPROVEMENT VANES IN THE INTAKE SYSTEM OF AN INTERNAL COMBUSTION ENGINE

This application is related to co-pending application Ser. Nos. 08/847,083 and 08/847,084 filed May 1, 1997.

FIELD OF THE INVENTION

The present invention relates to an air intake system for an internal combustion engine and more particularly to improved flow control including noise suppression and anti-sludging within the air intake system for an engine in a vehicle.

BACKGROUND OF THE INVENTION

Current internal combustion engines employed to power vehicles generally operate with air intake systems that include a throttle body and intake manifold assembly to control and direct the air flow into the engine. Intake air flow control is important not only for the obvious power output of the combustion chambers in the engine, but also for such things as minimizing noise emanating due to the air flow control system and also adequate long term operation of the system without undesirable concerns arising.

As for noise generation, this portion of the air intake system has generally been made of metal. However, in today's vehicles, an emphasis is placed on fuel economy and exhaust emissions reductions. This has lead to the desire to form the intake manifold and possibly even the throttle body out of plastic types of materials. Plastic arts can be formed which are lighter in weight and can be formed into more complex shapes than equivalent metal parts, allowing for improved air flow and thus improving both fuel economy and engine performance.

Although these improvements are welcome, nonetheless, there are other characteristics of plastics that are less desirable than equivalent metal components. For example, plastic is less dense than metal, which allows for more transmission of sound through it. Consequently, sound generated within the intake manifold, for instance, will more readily pass through into the engine compartment. This sound, then, can radiate to a driver of a vehicle, who may object to it. This is particularly true since, in general, engines are being designed overall to operate more quietly, making any stray noise more noticeable.

One noise generated within the intake manifold of an engine is a whooshing noise generated by the air flow pattern created as the air flows past a butterfly or other throttle valve in the throttle body. This is particularly true for engine conditions such as tip-in or fast opening of the throttle valve. With previous engines, either due to the other background noises produced which drowned out this whooshing noise or because the intake manifold was metal which substantially dampened the noise, vehicle drivers would not hear it. Now with quieter engines and plastic manifolds, it is noticeable and objectionable to some drivers.

Another concern with the intake air flow control system is that over the long term, build up of sludge can occur around the throttle valve, thus interfering with the smooth operation of this valve. One source for the contaminants causing the sludge is an exhaust gas recirculation (EGR) valve that feeds into the intake manifold just downstream of the throttle body. Due to packaging or flow reasons, it is sometimes desirable to locate the EGR valve immediately downstream of the throttle body. However, for these designs, the EGR gasses can end up circulating back toward the downstream side of the throttle valve before flowing downstream through the intake manifold. This allows for contaminates in the EGR gasses to build up on the throttle valve as sludge over time. With a build up of sludge, the throttle valve does not move as freely and can encounter temporary sticking conditions requiring more force when a vehicle operator first presses on the accelerator pedal.

Thus, it is desirable to employ an air intake system for a vehicle engine in which the air flow is controlled such that noise generated by air flow through the throttle body and intake manifold is reduced, thus reducing the noise that a vehicle operator will hear, while also minimizing any backflow of gasses from the intake manifold into the throttle body in order to minimize the chances for sludge build up on the throttle valve.

SUMMARY OF THE INVENTION

In its embodiments, the present invention contemplates an air intake system for controlling the flow of air into an internal combustion engine. The air intake system includes a throttle body including a first bore wall defining a first portion of a main bore and a valve mounted within the first portion of the main bore, with the valve being movable to selectively restrict the flow of air through the main bore. An intake manifold includes a second bore wall defining a second portion of the main bore, with the second bore wall having an upstream end. The manifold further includes means for mounting the throttle body relative to the intake manifold such that the first and the second portions of the main bore align with one another, with the intake manifold being downstream of the throttle body, and with the manifold including an EGR inlet adjacent the upstream end of the second bore wall. An EGR assembly is mounted to the EGR inlet. Also, the air intake system includes air control means, located downstream of the valve within the main bore, for diffusing and redirecting the flow of air within the main bore such that less sound is generated within the intake manifold and less air recirculates back into the first portion of the main bore.

The present invention further contemplates a method for controlling the air flowing through a bore of an intake manifold from an upstream located throttle body, having a bore with a valve therein, used with an internal combustion engine, the method comprising the steps of: orienting the valve to allow air flow past the valve in the bore of the throttle body; redirecting the air flow to create a generally uniform series of pairs of oppositely oriented adjacent vortices in the air flow downstream of the valve and upstream of at least a portion of the bore in the intake manifold; feeding EGR gasses into the air flow just downstream of the location where the air flow is redirected; flowing the air through the bore of the intake manifold; and adding fuel to the air flow downstream of the location where the EGR gasses feed into the air flow.

Accordingly, an object of the present invention is to diffuse and redirect the air flow between a throttle valve and an intake manifold in order to reduce objectionable noise produced by the flowing air.

A further object of the present invention is to accomplish the first object of the present invention while minimizing air flow restrictions in the air intake system and otherwise avoiding interference with the operation of the air intake system.

An additional object of the present invention is to redirect the air flow between the throttle valve and intake manifold in order to allow for EGR gasses to enter the intake manifold immediately downstream of the throttle body such that the backflow of EGR gasses to the throttle valve will be reduced.

An advantage of the present invention is that the noise emitted from an intake manifold, particularly one made of plastic, is reduced during engine operation.

A further advantage of the present invention is that contaminate laden EGR gasses will not backflow to the downstream side of the throttle valve, thus reducing the chance for unwanted sludge to build up and cause a throttle valve sticking condition.

BRIEF DESCRIPTION OF THE DRAWINGS

FIG. 1 is a partially exploded, perspective view of a portion of an air intake system for an internal combustion engine, in accordance with the present invention;

FIG. 2 is a side view of an air diffuser, taken in the direction of arrow 2 in FIG. 1;

FIG. 3 is a sectional view taken from line 3—3 in FIG. 2;

FIG. 4 is an end view taken along line 4—4 in FIG. 2;

DETAILED DESCRIPTION OF THE PREFERRED EMBODIMENTS

Figure 5:
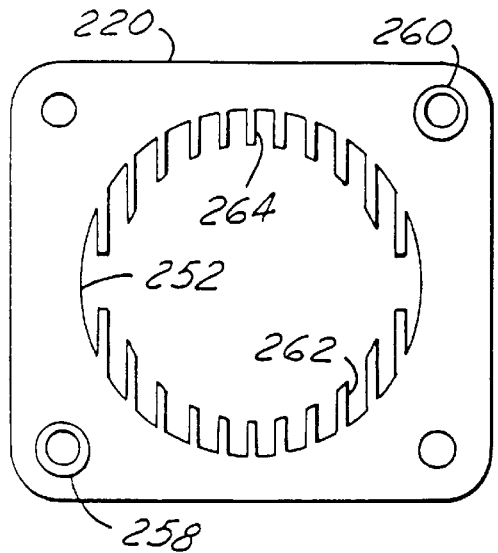
FIG. 5 is a side view of an air diffuser, similar to FIG. 2, illustrating a second embodiment of the present invention.

FIGS. 1–4 illustrate an embodiment of the present invention in which an air diffuser 20 is mounted between a throttle body 22 and an intake manifold 24, preferably fabricated of a plastic type of material. The throttle body 22 illustrated is conventional with a generally cylindrical wall defining a main bore 26 within which a butterfly valve 28 is mounted to a throttle shaft and lever assembly 30, which controls the angle of rotation of the valve 28. A mounting base 32 portion of the throttle body 22 includes four bolt holes 34 for mounting the throttle body 22 to the intake manifold 24. The throttle body 22 can be made of metal or plastic, as desired.

The intake manifold 24 is illustrated here for a V-type of engine configuration, but the invention applies as well to in-line engine configurations. The intake manifold 24 includes a generally cylindrical wall defining a main bore 36 of substantially the same diameter as the main bore 26 of the throttle body 22. This bore 36 splits into two smaller bores 38, one each for a respective one of the banks of cylinders in the engine, not shown. The smaller bores 38 lead to a corresponding one of two plenums 40 in the intake manifold 24, which in turn, direct the air through individual ports 42 to the engine. Fuel injectors, not shown, are located downstream of the throttle body 22, mounted to the intake manifold or the cylinder head of the engine, as the case may be, in a conventional manner. A mounting base 44 surrounds the entrance to the main bore 36 of the manifold 24, and includes four threaded bolt holes 46, for receiving bolts 48, which secures the throttle body 22 to the intake manifold 24.

An EGR inlet 68 to the intake manifold is located just downstream of the entrance to the main bore 36. An EGR assembly 70 mounts in this inlet 68 in order to provide a path for the Exhaust gasses that are recirculated from the engine exhaust to be drawn into the intake air stream. By being located at the upstream end of the intake manifold 24, the EGR gasses will flow into both banks of cylinders and can mix well with the intake air before entering the individual ports 42. Thus, in many instances it is desirable to locate the inlet 68 within about one main bore diameter of the upstream end of the intake manifold 24.

Mounted between the base 32 of the throttle body 22 and the base 44 of the manifold 24 is the air diffuser 20. The air diffuser 20 is basically a flat plate with a short, generally cylindrical wall defining a main bore 52 therethrough. The main bore 52 is sized to be essentially the same diameter as the main bore 26 in the throttle body 22. Four bolt holes 54 align with the bolt holes 34 in the throttle body 22, so that the main bores for the air diffuser 20, throttle body 22 and intake manifold 24 align. A recess 50 encircles the main bore 52, as well as a recess 50 around the main bore 36 of the intake manifold 24. These recesses are filled with conventional silicon sealer for sealing between the various parts.

In order to assure proper alignment and orientation of the air diffuser 20 relative to the throttle body 22, a pair of bosses extend from the upstream side 56 of the air diffuser 20. The first boss 58 has a cylindrical wall, which is sized to fit within a similarly shaped and sized recess, not shown, in the base 32 of the throttle body 22 about a corresponding bolt hole 34. The second boss 60 has a generally cylindrical wall with a pair of flats opposite one another on it. This second boss 60 is sized to fit within a similarly shaped and sized recess, not shown, in the base 32 of the throttle body 22 about a corresponding bolt hole 34. The bosses 58, 60 then, assure that the air diffuser 20 can only be installed in the proper orientation.

Extending from the wall of the main bore 52 of the air diffuser 20 are two sets of vanes, a lower set of vanes 62 and an upper set of vanes 64. The lower set of vanes 62 extend upward from the main bore 52 parallel to each other. The lower vanes 62 are as deep as the width of the diffuser 20 itself. The spacing between the lower vanes 62 is also approximately equal. The upper set of vanes 64 extend downward from the main bore 52 parallel to each other and are shorter than the lower set of vanes 62. The upper vanes 64 are generally equally spaced apart. The upper vanes 64 are also as deep as the width of the diffuser 20 itself at their bases, but the upstream edges taper as they extend downward from the bore wall. Also, the upper vanes 64 in the middle of the set are shorter than the others.

The reason for the size and shape variations between the upper and lower sets of vanes 62, 64 is not for air flow reasons, but because of possible interference with the butterfly valve 28 when it rotates toward its full open position. For the particular throttle body 22 illustrated herein, the butterfly valve rotates clockwise as viewed in FIG. 1, thus causing the upper edge of the valve 28 to tip downstream toward the air diffuser 20 while the lower edge tips upstream away from the air diffuser 20. The butterfly valve 28 is located downstream in the main bore 26 such that, for some open positions, the upper edge extends downstream beyond the bore 26, through the main bore 52 of the air diffuser 20 and into the main bore 36 of the intake manifold 24. The reason for the downstream location of the butterfly valve 28 is that the throttle body 22 is supported by the intake manifold 24 in a cantilever fashion, so the farther the throttle body 22 extends from the manifold 24, the more bending moment the mounting base 44 of the manifold 24 has to support. Consequently, the upper set of vanes 64 are limited in length for particular throttle body configurations in order to avoid interfering with the movement of the butterfly valve 28, while the lower set of vanes 62 do not have this interference concern.

An example of typical dimensions for the air diffuser 20 for a common V-6 engine having a nominal main bore diameter of about 66 millimeters (mm) would be generally equal center-to-center spacing of about 5 to 6 mm with the vanes 62,64 being about 1.5 mm thick and having an average height for all of the vanes of about 10 mm. The spacing between the vanes can be narrower. However, narrower spacing, in general, does not improve the noise attenuation sufficiently to justify the increased flow restrictions. Also, some minimum spacing limit is desirable to avoid the potential for sludge and ice build-up between the vanes, which can interfere with air flow. Additionally, the vanes 62,64 can be configured with a greater thickness, however, the trade-off between the amount of obstruction caused by the vanes (reducing horsepower of the engine) and the noise attenuation improvement by lengthening the vanes must be considered. The thickness of the plate portion of the air diffuser 20 can also be varied depending upon space constraints and the desired air flow effect. There is an increase in attenuation with increased plate thickness, however, throttle plate clearance is needed and increased length will also increases flow losses.

The operation of the air intake system will now be described. When the engine, not illustrated, is operating in an idle mode, the butterfly valve 28 is closed, and only a small amount of air passes through the throttle body 22 and into the manifold 24. As the butterfly valve 28 begins to open, the air now flows through the main bore 26 around the top and bottom edges of the butterfly valve 28. Generally, then, the air flow is along the top and bottom of the main bore 26, flowing generally between the vanes 62,64, which are located along the upper and lower surfaces of the air diffuser bore 52.

When the air flows past the partially open throttle plate, a high velocity turbulent air flow is created by the pressure drop across the throttle plate 28. As the air flows between the vanes 62,64, the vanes 62,64 will diffuse and redirect the air flow patter such that the air creates small vortices of turbulence around each vane, but with each adjacent vorticy rotating in the opposite direction, thus canceling each other out. This reduces the noise created, which reduces the noise radiated from the intake manifold 24. So, proper spacing depends upon getting effective canceling out of vortices as opposed to random spacing which may just cause turbulence in the air flow.

Generally the whoosh noise generated is the greatest at tip-in or fast opening of the throttle plate and also at part throttle cruising/tip-in conditions, which can be mistaken by a driver for a vacuum leak on the engine. Thus, with this new air flow pattern, the whoosh noise generated from the air flow will be attenuated, consequently reducing the overall noise passing through the stake manifold 24 and into the engine compartment. Again, the amount of noise attenuation improvement due to an increase in the size of the vanes must be balanced against the amount of flow loss (and hence horsepower loss) due to the vanes being in the air stream.

Another effect of the diffusing and redirecting of the air flow by the vanes 62,64 is that any backflow from the swirling air just downstream of the butterfly valve 28 will be reduced. Thus, some of the inlet air that might otherwise be drawn back against the downstream side of the butterfly valve 28 will continue flowing downstream into the manifold 24. For this manifold assembly, where it is desirable to locate the EGR inlet 68 close to the upstream end of the intake manifold 24, some of the EGR gasses can become entrained in the inlet air which is drawn back to the downstream side of the butterfly valve 28. Since the EGR gasses are likely to contain contaminates, these can settle on the butterfly valve 28 and downstream portion of the throttle body main bore 26 to form sludge. Consequently, the vanes 62,64, by diffusing and redirecting the inlet air, will significantly reduce the amount of backflow and hence the risk of contaminates from the EGR gasses causing build up of sludge on and a sticking condition of the butterfly valve 28.

A second embodiment of the present invention is illustrated in FIG. 5. This air diffuser 220 is used in place of the air diffuser 20, illustrated in FIG. 1, for this embodiment. In this second embodiment, similar elements are similarly designated, but with 200 series numbers. The vanes 262,264 in the air diffuser 220 are the same length for both the upper set 264 and the lower set 262. Both taper downstream as they extend inward into the bore 252, in order to avoid potential interference with the throttle valve 28 on the upper vanes 264. Further, the first boss 258 and second boss 260 are sized and shaped the same. The advantage of tapering both sets of vanes 262,264 and providing equal lengths is that the air diffuser 220 is now symmetrical between its top and bottom and can thus be installed with either set of vanes acting as the upper vanes, making assembly somewhat easier. The disadvantage is the risk of interference between the upper vanes 262 and the throttle valve 28 since the upper vanes 262 are now longer, depending upon the configuration of the particular throttle body 22 one employs.

Figure 6:
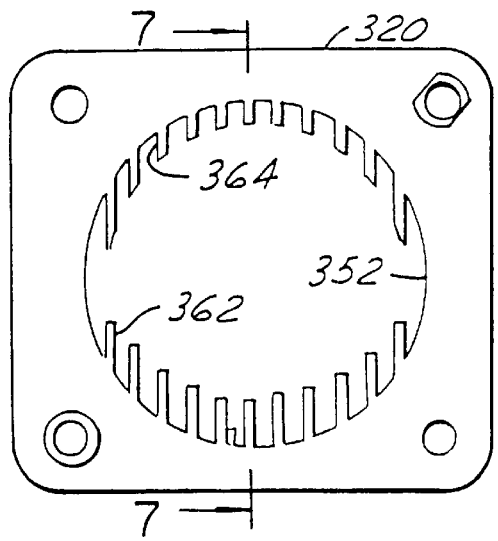
FIG. 6 is a side view of an air diffuser, similar to FIG. 2, illustrating a third embodiment of the present invention.
Figure 7:
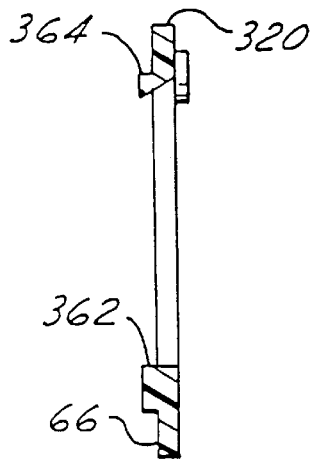
FIG. 7 is a sectional view taken along line 7—7 in FIG. 6.

FIGS. 6 and 7 illustrate a third embodiment of the present invention. This air diffuser 320 is used in place of the air diffuser 20, illustrated in FIG. 1, for this embodiment. In this third embodiment, similar elements are similarly designated, but with 300 series numbers. The upper vanes 364 and the lower vanes 362 now not only extend into the bore 352, but also extend aft of the downstream surface 66 of the air diffuser 320. This allows for more influence on the air flow pattern by the vanes 362,362 without having to increase the thickness of the plate itself, assuring that the space taken by the air diffuser 320 is minimized.

Figure 8:
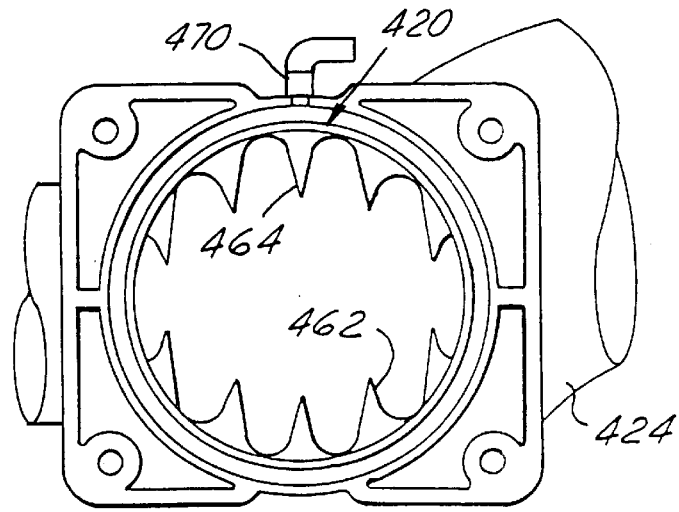
FIG. 8 is a partial, side view of an intake manifold illustrating a fourth embodiment of the present invention.

FIG. 8 illustrates a fourth embodiment of the present invention. This integral air diffuser 420 is used in place of the air diffuser 20, illustrated in FIG. 1, for this embodiment. In this fourth embodiment, similar elements are similarly designated, but with 400 series numbers. The air diffuser 420 is now not formed from a separate plate, but is integral with the intake manifold 424. The lower vanes 462 and the upper vanes 464 are molded into the main bore 436 of a plastic intake manifold 424. Consequently, the chance for interference between the vanes and the butterfly valve 28, seen in FIG. 1, is lessened, while also minimizing the cantilever of the throttle body from the intake manifold 424 and the overall size of this structure. Further, one less part and seal need to be assembled. On the other hand, moldings for plastic intake manifolds 424 generally are complex and this adds to the complexity of the molding, which may or may not make this a desirable alternative depending upon ones design constraints. Also, the EGR assembly 470 may need to be mounted downstream farther into the manifold 424 because of the location of the upper vanes 464.

Figure 9:
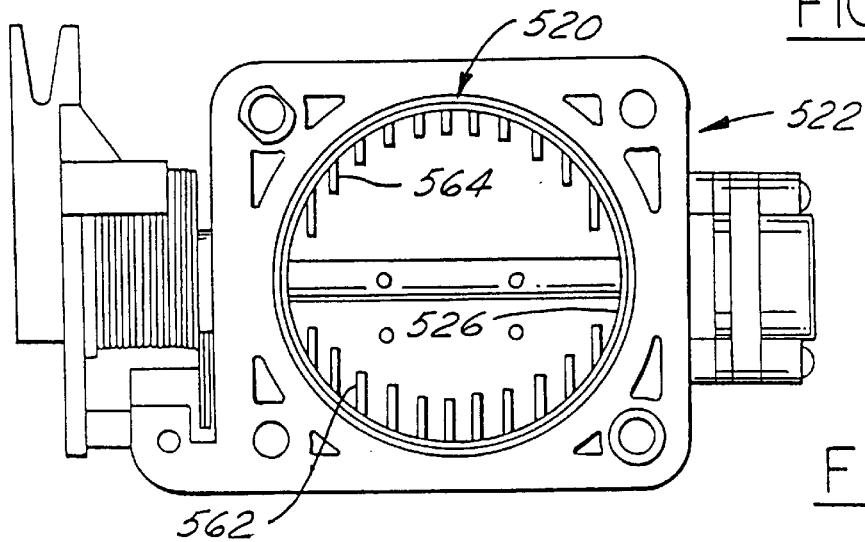
FIG. 9 is a side view of a throttle body, illustrating a fifth embodiment of the present invention.

FIG. 9 illustrates a fifth embodiment of the present invention. This integral air diffuser 520 is used in place of the air diffuser 20, illustrated in FIG. 1, for this embodiment. In this fifth embodiment, similar elements are similarly designated, but with 500 series numbers. The air diffuser 520 again is not formed from a separate plate, but now is integral with the throttle body 522, with the lower set of vanes 562 and the upper set of vanes 564 mounted to the wall of the main bore 526 of the throttle body 522. Again, one less part and seal need to be assembled, and the overall size of the structure can be reduced. On the other hand, this complicates the fabrication of the throttle body 522 and makes designing to avoid interference between the upper vanes 564 and the butterfly valve more significant, which may or may not be desirable for a given situation.

Figure 10:
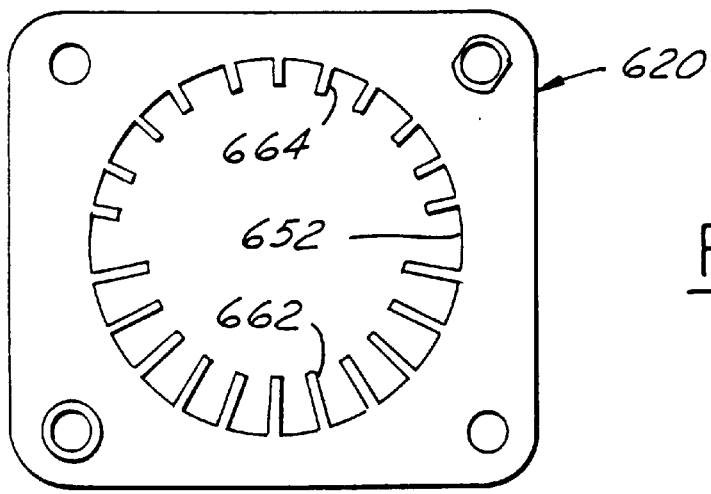
FIG. 10 is a side view of an air diffuser, similar to FIG. 2, illustrating a sixth embodiment of the present invention.

A sixth embodiment of the present invention is shown in FIG. 10. This air diffuser 620 is used in place of the air diffuser 20, illustrated in FIG. 1, for this embodiment. In this sixth embodiment, similar elements are similarly designated, but with 600 series numbers. The upper set of vanes 664 and the lower set of vanes 662 now extend radially into the main bore 652, with the upper set of vanes 664 shorter than the lower set 662 and tapered as they extend radially inward. The taper is done for the same potential interference reasons as with the first embodiment. The radially oriented vanes 662,664 can work as compared to parallel vanes, but are not generally as effective as with parallel spacing. The reason being that at throttle tip-in conditions, if the vane spacing is set to its maximum effectiveness at the outer radial locations of the vanes 662,664, the proper diffusion and redirection of the air flow may not be as effective at the inner radial locations since the ends of the fins approach one another as they extend radially inward, thus changing the amount of gap between them.

Figure 11:
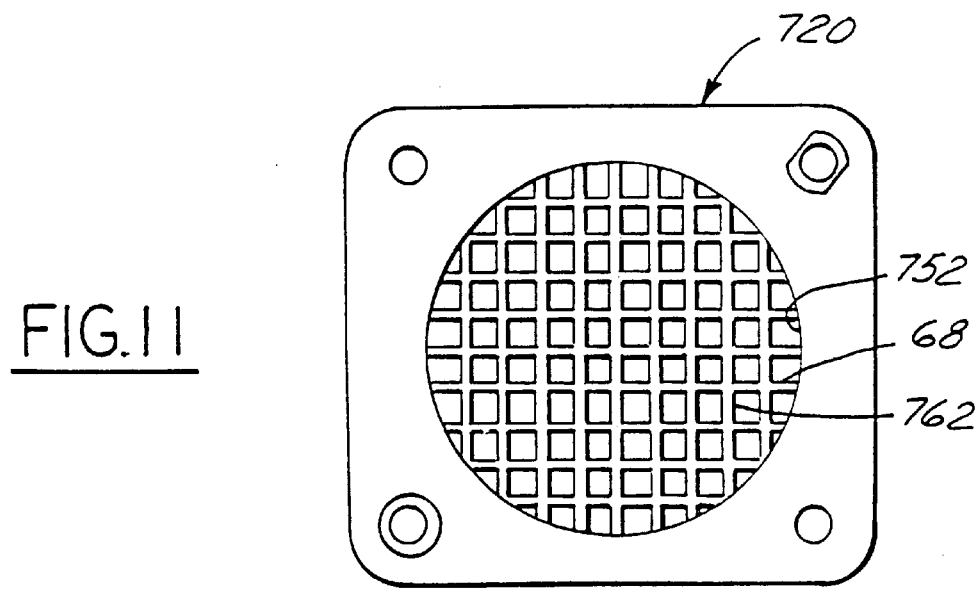
FIG. 11 is a side view of an air diffuser, similar to FIG. 2, illustrating a seventh embodiment of the present invention.

FIG. 11 illustrates a seventh embodiment of the present invention. This air diffuser 720 is used in place of the air diffuser 20, illustrated in FIG. 1, for this embodiment. In this seventh embodiment, similar elements are similarly designated, but with 700 series numbers. The upper set of parallel vanes and the lower set of parallel vanes are really now just one continues set of vertical vanes 762, along with the addition of parallel horizontal vanes 68. This forms a full grid pattern of vanes. The thickness of these vanes is constant along the length of the vanes. While the full grid pattern is most effective for diffusing and redirecting the air flow and thus for attenuation of the noise, there are very substantial flow losses created due to the significant amount of blockage of the main bore 752. This blockage will thus significantly reduce the maximum horsepower of the engine.

Figure 12:
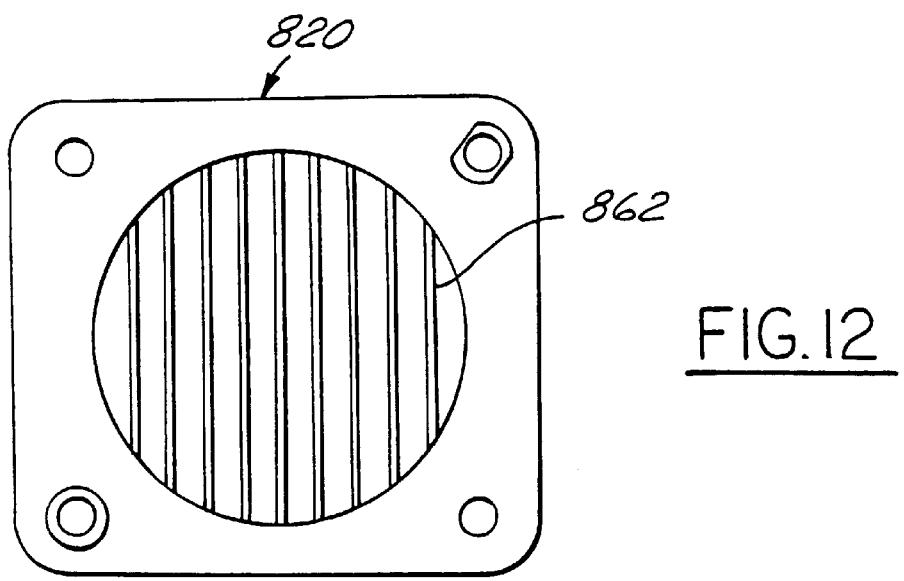
FIG. 12 is a side view of an air diffuser, similar to FIG. 2, illustrating an eighth embodiment of the present invention.

FIG. 12 illustrates an eighth embodiment of the present invention. This air diffuser 820 is used in place of the air diffuser 20, illustrated in FIG. 1, for this embodiment. In this eighth embodiment, similar elements are similarly designated, but with 800 series numbers. This embodiment employs the same parallel vertical vanes 862 as in the seventh embodiment, but without the addition of horizontal vanes. This is a compromise from the seventh embodiment, in that the noise attenuation will not be as great, but the blockage will also be less. For both the seventh and eighth embodiments, one must keep in mind that the location of the butterfly valve in the throttle body is important because of the potential for interference between the grid or line pattern and an edge of the valve when the valve is in certain open positions.

While certain embodiments of the present invention have been described in detail, those familiar with the art to which this invention relates will recognize various alternative designs and embodiments for practicing the invention as defined by the following claims.

I claim:

1. An air intake system for controlling the flow of air into an internal combustion engine comprising:

a throttle body including a first bore wall defining a first portion of a main bore and a valve mounted within the first portion of the main bore, with the valve being movable to selectively restrict the flow of air through the main bore;

an intake manifold including a second bore wall defining a second portion of the main bore, with the second bore wall having an upstream end, and the manifold further including means for mounting the throttle body relative to the intake manifold such that the first and the second portions of the main bore align with one another, with the intake manifold being downstream of the throttle body, and with the manifold including an EGR inlet adjacent the upstream end of the second bore wall;

an EGR assembly mounted to the EGR inlet; and air control means, located downstream of the valve within the main bore, for diffusing and redirecting the flow of air within the main bore such that less sound is generated within the intake manifold and less air recirculates back into the first portion of the main bore.

2. The air intake system of claim 1 wherein the air control means includes a plurality of vanes, spaced from one another, forming a first set, extending from one of the portions of the main bore wall into the main bore.

3. The air intake system of claim 2 wherein the first set of vanes is mounted to the first bore wall.

4. The air intake system of claim 2 wherein the first set of vanes are mounted to the second bore wall.

5. The air intake manifold of claim 2 wherein the vanes in the first set of vanes extend downstream into the second portion of the main bore.

6. The air intake system of claim 2 wherein the first set of vanes are oriented and extend radially relative to the main bore.

7. The air intake system of claim 6 wherein the first set of vanes taper as they extend away from one of the portions of the bore wall.

8. The air intake system of claim 6 wherein the air control means also include a second set of radial vanes, spaced from one another, extending into a different portion of the main bore than the first set.

9. The air intake system of claim 8 further including an air diffuser plate having a third bore wall defining a third portion of the main bore aligned with the first and the second portions of the main bore, with the air diffuser plate mounted between the throttle body and the intake manifold, and wherein the first and the second set of radial vanes are mounted to the third bore wall.

10. The air intake system of claim 8 wherein the average length of first set of radial vanes is shorter than the average length of the second set of radial vanes.

11. The air intake system of claim 2 wherein the first set of vanes are oriented and extend from a portion of the main bore wall parallel to and spaced from one another.

12. The air intake system of claim 11 wherein the air control means also includes a second set of parallel vanes, spaced from one another, extending from a different portion of the bore wall than the first set.

13. The air intake system of claim 12 wherein the air control means includes an air diffuser plate having a third bore wall defining a third portion of the main bore aligned with the first and second portion of the main bore, with the air diffuser plate mounted between the throttle body and the intake manifold wherein the first and second set of parallel vanes are mounted on the third bore wall.

14. The air intake system of claim 1 wherein the second bore wall is defined by a diameter and the EGR inlet is located on the intake manifold within about one diameter of the upstream end of the second bore wall.

15. An air intake system for controlling the flow of air into an internal combustion engine comprising:

a throttle body including a first bore wall defining a first portion of a main bore and a valve mounted within the first portion of the main bore, with the valve being movable to selectively restrict the flow of air through the main bore;

an intake manifold including a second bore wall defining a second portion of the main bore, with the second bore wall having an upstream end, and the manifold further including means for mounting the throttle body relative to the intake manifold such that the first and the second portions of the main bore align with one another, with the intake manifold being downstream of the throttle body, and with the manifold including an EGR inlet adjacent the upstream end of the second bore wall;

an EGR assembly mounted to the EGR inlet;

an air diffuser plate having a third bore wall defining a third portion of the main bore aligned with the first and second portion of the main bore, with the air diffuser plate mounted between the throttle body and the intake manifold; and air control means, located downstream of the valve within the main bore, for diffusing and redirecting the flow of air within the main bore such that less sound is generated within the intake manifold and less air recirculates back into the first portion of the main bore.

16. The air intake system of claim 15 wherein the air control means includes a plurality of vanes, spaced from one another, forming a first set, extending from one of the portions of the third bore wall into the main bore.

17. The air intake system of claim 16 wherein the air control means also includes a second set of vanes mounted to and extending from the third bore wall.

18. A method for controlling the air flowing through a bore of an intake manifold from an upstream located throttle body, having a bore with a valve therein, used with an internal combustion engine, the method comprising the steps of:

orienting the valve to allow air flow past the valve in the bore of the throttle body;

redirecting the air flow to create a generally uniform series of pairs of oppositely oriented adjacent vortices in the air flow downstream of the valve and upstream of at least a portion of the bore in the intake manifold;

feeding EGR gasses into the air flow just downstream of the location where the air flow is redirected;

flowing the air through the bore of the intake manifold; and adding fuel to the air flow downstream of the location where the EGR gasses feed into the air flow.

19. The method of claim 18 wherein the step of redirecting the air flow includes providing vanes extending into the air flow downstream of the valve.

20. The method of claim 18 wherein the step of redirecting includes providing diffuser means for supporting vanes located between the throttle body and the intake manifold, and providing a plurality of vanes extending parallel to each other from the diffuser means into the air flow.

\* \* \* \* \*